(12) United States Patent
Kim et al.

(10) Patent No.: US 8,962,733 B2
(45) Date of Patent: Feb. 24, 2015

(54) THERMOPLASTIC RESIN COMPOSITION

(71) Applicant: Cheil Industries Inc., Gumi-si (KR)

(72) Inventors: Young-Sin Kim, Uiwang-si (KR);
Doo-Han Ha, Uiwang-si (KR);
Jin-Young Huh, Uiwang-si (KR);
Hye-Young Kim, Uiwang-si (KR);
Ywan-Hee Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/711,116

(22) Filed: Dec. 11, 2012

(65) Prior Publication Data
US 2013/0150480 A1    Jun. 13, 2013

(30) Foreign Application Priority Data

Dec. 13, 2011  (KR) .................. 10-2011-0133727
Dec. 26, 2011  (KR) .................. 10-2011-0142410
Dec. 30, 2011  (KR) .................. 10-2011-0147862

(51) Int. Cl.
C08K 3/08      (2006.01)
C08L 23/00     (2006.01)
C08L 25/04     (2006.01)
C08L 33/08     (2006.01)
C08L 33/10     (2006.01)
C08L 55/02     (2006.01)
C08L 67/00     (2006.01)
C08L 69/00     (2006.01)
C08L 33/20     (2006.01)
C08K 7/22      (2006.01)
C08L 25/12     (2006.01)

(52) U.S. Cl.
CPC . C08L 33/20 (2013.01); C08K 3/08 (2013.01); C08K 7/22 (2013.01); C08L 25/12 (2013.01); C08L 55/02 (2013.01)
USPC ........................... 524/441; 524/339; 524/440

(58) Field of Classification Search
CPC .. C08K 3/08; C08K 2003/0812; C08L 23/00; C08L 25/04; C08L 33/08; C08L 33/10; C08L 55/02; C08L 67/00; C08L 69/00
USPC ................................................. 524/339–441
See application file for complete search history.

(56) References Cited

U.S. PATENT DOCUMENTS

| 5,478,878 | A | 12/1995 | Nagaoka et al. | |
|---|---|---|---|---|
| 5,530,051 | A | 6/1996 | Hirata et al. | |
| 5,741,446 | A | 4/1998 | Tahara et al. | |
| 2002/0028868 | A1 | 3/2002 | Brasser et al. | |
| 2005/0245645 | A1 | 11/2005 | Howie | |
| 2007/0276083 | A1 | 11/2007 | Higashi et al. | |
| 2008/0319089 | A1* | 12/2008 | Muller et al. | 514/770 |
| 2009/0214827 | A1 | 8/2009 | Howie | |
| 2010/0011992 | A1* | 1/2010 | Bujard et al. | 106/439 |
| 2012/0129992 | A1 | 5/2012 | Kang et al. | |
| 2012/0264869 | A1 | 10/2012 | Lee et al. | |
| 2012/0270988 | A1 | 10/2012 | Lee et al. | |

FOREIGN PATENT DOCUMENTS

| CN | 1310747 A | | 8/2001 |
|---|---|---|---|
| EP | 0439111 A1 | | 7/1991 |
| EP | 0566377 A1 | | 10/1993 |
| EP | 2371522 A1 | * | 10/2011 |
| JP | 58-222124 | | 6/1982 |
| JP | 59-115357 | | 12/1982 |
| JP | 61228073 A | * | 10/1986 |
| JP | 62101654 A | * | 5/1987 |
| JP | 63-035659 | | 2/1988 |
| JP | 05-112668 A | | 5/1993 |
| JP | 06-316683 A | | 11/1994 |
| JP | 1995-196901 A | | 8/1995 |
| JP | 08-041284 A | | 2/1996 |
| JP | 11-066956 | | 8/1997 |
| JP | 2000-086889 A | | 3/2000 |
| JP | 2000-313747 | | 11/2000 |
| JP | 2001509524 W | * | 7/2001 |
| JP | 2001-262003 A | | 9/2001 |
| JP | 2001-269978 A | | 10/2001 |
| JP | 2002-256151 | | 9/2002 |
| JP | 2003-073557 A | | 3/2003 |
| JP | 2003-292717 A | | 10/2003 |
| JP | 2006-205571 A | | 8/2006 |
| JP | 2007-137963 A | | 6/2007 |

(Continued)

OTHER PUBLICATIONS

Biggs (Metal-filled Polymers: Properties and Applications: Chapter 3 Electrical Properties of Metal-Filled Polymer Composites. Issue 11 of Donald E. Hudgin vol. 11 of Plastics Engineering. Ed. Swapan K. Bhattacharya. CRC Press, 1996, pp. 165-226).*
Machine translation of JP 61-228073 (Aug. 2013, 5 pages).*
Japanese Abstract of JP 61-228073 (Oct. 1986).*
JPO Abstract of JP 62101654 (May 1987).*
Machine translated English equivalent of JP 2001509524 (Jul. 2001).*
European Search Report and Written Opinion in counterpart European Application No. 12196914.1 dated Apr. 16, 2013, pp. 1-7.

(Continued)

Primary Examiner — Brieann R Fink
(74) Attorney, Agent, or Firm — Additon, Higgins & Pendleton, P.A.

(57) ABSTRACT

A thermoplastic resin composition includes a thermoplastic resin and a first metal particle, wherein the first metal particle has a ratio of a short diameter relative to a long diameter of about 1/50 to about 1/6. Also a thermoplastic resin composition includes a thermoplastic resin, a plate-shaped second metal particle, and plate-shaped mica, wherein the plate-shaped mica is included in an amount of about 0.01 parts by weight to about 4.9 parts by weight based on about 100 parts by weight of the thermoplastic resin. In addition a thermoplastic resin composition includes a thermoplastic resin, a plate-shaped third metal particle or a spherical fourth metal particle, and thermally expandable particulate, wherein the thermally expandable particulate includes a polymer particle including a hydrocarbon foamable compound therein.

6 Claims, No Drawings

(56) References Cited

FOREIGN PATENT DOCUMENTS

| | | |
|---|---|---|
| JP | 2009-120705 | 6/2009 |
| JP | 2009-120789 A | 6/2009 |
| JP | 2009-120791 A | 6/2009 |
| JP | 2010-235699 A | 10/2010 |
| JP | 2011-070019 A | 4/2011 |
| KR | 10-2000-0001344 A | 1/2000 |
| KR | 10-2000-0055397 A | 9/2000 |
| KR | 10-2004-0058772 A | 7/2004 |
| KR | 10-0690898 B1 | 2/2007 |
| KR | 10-2010-0058484 A | 6/2010 |
| KR | 10-2011-0008598 A | 1/2011 |
| KR | 10-2011-0079465 A | 7/2011 |
| KR | 10-2011-0079466 A | 7/2011 |
| WO | 00/06648 A1 | 2/2000 |
| WO | 01/42356 A1 | 6/2001 |
| WO | 2011/081305 A2 | 7/2011 |

OTHER PUBLICATIONS

Search Report in counterpart Taiwanese Application No. 101147257 dated Jun. 11, 2014, pp. 1.

\* cited by examiner

THERMOPLASTIC RESIN COMPOSITION

CROSS-REFERENCE TO RELATED APPLICATION

This application claims priority to and the benefit of Korean Patent Application No. 10-2011-0133727 filed in the Korean Intellectual Property Office on Dec. 13, 2011, Korean Patent Application No. 10-2011-0142410 filed in the Korean Intellectual Property Office on Dec. 26, 2011, and Korean Patent Application No. 10-2011-0147862 filed in the Korean Intellectual Property Office on Dec. 30, 2011, the entire disclosure of each of which is incorporated herein by reference.

A thermoplastic resin composition is disclosed.

FIELD

BACKGROUND

Plastic exterior products in a variety of colors and with a high quality sense of touch are increasingly popular for electronic parts, automobile parts and the like. Plastic exterior products can be formed of a resin composition including a thermoplastic resin and metal particles distributed therein to give a metal-like texture to the product.

Japanese Patent Laid-Open Publication Nos. 2001-262003 and 2007-137963 discuss adding metal particles to a plastic resin, but the metal-like texture did not appear in an actual experiment. Also, there is a problem in that a flow mark or a weld line is formed during an injection molding process.

Japanese Patent Laid-Open Publication No. 1995-196901 discusses adding a metal microplate having an average aspect ratio (average thickness/average particle diameter) of about 1/100 to about 1/8 obtained through a punching process to a resin to provide a metal-like texture. This process, however, is also limited by formation of a weld line.

SUMMARY

One embodiment of the present invention provides a thermoplastic resin composition which can form few or no flow mark(s) and/or weld line(s) and can have high luminance and excellent metal-like texture.

According to one embodiment of the present invention, provided is a thermoplastic resin composition that includes a thermoplastic resin and a first metal particle, wherein the first metal particle has a ratio of a short diameter relative to a long diameter of about 1/50 to about 1/6.

The first metal particle may have a ratio of a thickness relative to a long diameter of about 1/400 to about 1/2.

The first metal particle may have a long diameter of about 30 to about 5,000 μm.

The first metal particle may have an average particle diameter of about 8 to about 100 μm.

The thermoplastic resin composition may include the first metal particle in an amount of about 0.2 parts by weight to about 5 parts by weight based on about 100 parts by weight of the thermoplastic resin.

The thermoplastic resin may be a polycarbonate resin, a rubber modified vinyl-based copolymer resin, a polyester resin, a polyalkyl(meth)acrylate resin, a styrenic resin, a polyolefin resin, or a combination thereof.

The thermoplastic resin composition may further optionally include an inorganic particle that is different from the first metal particle. The inorganic particle may be a glass particle, mica, graphite, a pearl particle, or a combination thereof.

According to another embodiment of the present invention, provided is a thermoplastic resin composition that includes a thermoplastic resin, plate-shaped second metal particle, and plate-shaped mica. The thermoplastic resin composition may include the plate-shaped mica in an amount of about 0.01 parts by weight to about 4.9 parts by weight based on about 100 parts by weight of the thermoplastic resin.

The thermoplastic resin may be a polycarbonate resin, a rubber modified vinyl-based copolymer resin, a polyester resin, a polyalkyl(meth)acrylate resin, a styrenic resin, a polyolefin resin, or a combination thereof.

The thermoplastic resin composition may include the plate-shaped second metal particle in an amount of about 0.01 parts by weight to about 4 parts by weight based on about 100 parts by weight of the thermoplastic resin.

The plate-shaped second metal particle may have a ratio of a thickness relative to a long diameter of about 1/80 to about 1/1.

The plate-shaped mica may be coated with $TiO_2$ on the surface.

The plate-shaped mica may have a ratio of a thickness relative to a long diameter of about 1/100 to about 1/2.

According to another embodiment of the present invention, provided is a thermoplastic resin composition that includes a thermoplastic resin, a plate-shaped third metal particle, or a spherical fourth metal particle and thermally expandable particulate, wherein the thermally expandable particulate includes a polymer particle including a hydrocarbon foamable compound therein.

The thermoplastic resin may include about 0.01 parts by weight to about 10 parts by weight the plate-shaped third metal particle or spherical fourth metal particle, and about 0.5 parts by weight to about 15 parts by weight of the thermally expandable particulate based on about 100 parts by weight of the thermoplastic resin.

The plate-shaped third metal particle may have a long diameter of about 5 to about 100 μm. The spherical fourth metal particle may have an average particle diameter of about 5 to about 100 μm.

The thermally expandable particulate may include a polymer having a glass transition temperature of about 30 to about 120° C.

The thermally expandable particulate may have a maximum expansion temperature of about 150 to about 280° C.

The thermally expandable particulate may have an average particle diameter before expansion of about 5 to about 60 μm, and may have an average particle diameter at a maximum expansion temperature of about 10 to about 100 times in a volume relative to the average particle diameter before expansion.

The thermoplastic resin composition may further optionally include an inorganic particle that is different from the plate-shaped third metal particle and/or the spherical fourth metal particle. The inorganic particle may be a glass particle, mica, graphite, a pearl particle, or a combination thereof.

The thermoplastic resin composition according to exemplary embodiments of the invention can exhibit high luminance and excellent metal-like texture and can have few or no flow mark(s) and/or weld line(s).

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

When a specific definition is not otherwise provided, the term "(meth)acrylate" may refer to "acrylate" and "methacrylate"; "(meth)acrylic acid alkyl ester" may refer to both "acrylic acid alkyl ester" and "methacrylic acid alkyl ester", and "(meth)acrylic acid ester" may refers to both "acrylic acid ester" and "methacrylic acid ester".

When a specific definition is not otherwise provided, the term "copolymerization" may refer to block copolymerization, random copolymerization, graft copolymerization, or alternate copolymerization, and the term "copolymer" may refer to a block copolymer, a random copolymer, a graft copolymer, or an alternate copolymer.

When a specific definition is not otherwise provided, as used herein, the term "diameter" denotes the length of a line connecting two points in a closed curved, passing through the center of a particle, and the "closed curve" is a curved line where a point moves in one direction and returns to the departure point. Also as used herein, the term "long diameter" (major axis) indicates the longest diameter, the term "short diameter" (minor axis) indicates the shortest diameter, and the term "average diameter" indicates the diameter of 50% on cumulative particle size distribution curve. Also when a specific definition is not otherwise provided, as used herein, the terms "particle size," "average particle diameter," "grain size," "equivalent diameter," and the like may have the same meaning.

As used herein, the term, "thickness" means the length of the longest axis perpendicular to the plane containing the major axis and the minor axis.

According to exemplary embodiments, a composition having a metal-like texture without painting and the molded product thereof are provided.

Flop index is used as an index of metal-like texture of molded product. Flop index (FI) is an index showing metal texture of a surface and may be generally obtained by measuring luminance (L) of reflective light at about 15°, 45° and 110°.)L(x° may refer to luminance at x°. Flop index can be calculated using the following formula:

$$FI = 2.69 * (L(15°) - L(110°))^{1.11} / L(45°)^{0.86}$$

wherein L(15°), L(45°), and L(110°) are the measured luminance (L) of reflective light at about 15°, 45° and 110°, respectively.

The flop index of a surface having no metal texture is indicated to 0, the flop index of a metal ranges from about 15 to about 17, the flop index of a metal texture coating used for an automobile body paint is about 11, and the flop index of a metal texture sensed by eyes (that is, which can be detected or is visible to the naked eye) is greater than or equal to about 6.5.

A metal-like texture may be realized by appropriately combining the average particle diameter of metallic particles, diameter distribution and surface roughness of the particles, and a combination of each particle. The present invention provides an optimal composition to realize a metal-like texture and a molded product formed of the composition.

First Embodiment

According to one embodiment of the present invention, provided is a thermoplastic resin composition that includes a thermoplastic resin and a first metal particle, wherein the first metal particle has a ratio of a short diameter relative to a long diameter of about 1/50 to about 1/6. As noted herein, the "short diameter" indicates the shortest diameter.

The first metal particle may be a plate-shaped metal particle.

The thermoplastic resin composition can generate few or no flow mark(s) and/or weld line(s) during injection molding, and thus can provide a molded product that can have an excellent metal-like texture.

Accordingly, the thermoplastic resin composition can be used to make a molded product that can have an excellent appearance, for example, an exterior plastic product for electronic parts, automobile parts and the like, without requiring an additional painting process.

Hereinafter each component included in the thermoplastic resin composition is described in detail.

Thermoplastic Resin

The thermoplastic resin may be any thermoplastic resin. Examples of the thermoplastic resin may include without limitation polycarbonate resins, rubber modified vinyl-based copolymer resins, polyester resins, polyalkyl(meth)acrylate resins, styrenic resins, polyolefin resins, and the like, and combinations thereof. The thermoplastic resin may provide basic properties such as impact resistance, heat resistance, flexural characteristics, tensile characteristics, and the like.

The polycarbonate resin may be prepared by reacting one or more diphenols with a compound of a phosgene, halogen formate, carbonate ester, or a combination thereof.

Examples of the diphenols include without limitation hydroquinone, resorcinol, 4,4'-dihydroxydiphenyl, 2,2-bis(4-hydroxyphenyl)propane (referred to as "bisphenol-A"), 2,4-bis (4-hydroxyphenyl)-2-methylbutane, bis(4-hydroxyphenyl) methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis (4-hydroxyphenyl)ketone, bis(4-hydroxyphenyl)ether, and the like. In exemplary embodiments, 2,2-bis(4-hydroxyphenyl)propane, 2,2-bis(3,5-dichloro-4-hydroxyphenyl)propane and/or 1,1-bis(4-hydroxyphenyl)cyclohexane may be used, for example 2,2-bis(4-hydroxyphenyl)propane may be used.

The polycarbonate resin may have a weight average molecular weight of about 10,000 to about 200,000 g/mol, for example about 15,000 to about 80,000 g/mol, but the present invention is not limited to the use of polycarbonate with a molecular weight falling within the above ranges.

The polycarbonate resin may be a copolymer or a mixture of copolymers obtained using two or more diphenols that differ from each other. Other polycarbonate resins may include without limitation linear polycarbonate resins, branched polycarbonate resins, polyester carbonate copolymer resins, and the like, and combinations thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with one or more diphenols and a carbonate. The multi-functional aromatic compound may be included in an amount of 0.05 to 2 mol % based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like.

The rubber modified vinyl-based copolymer resin is a copolymer including about 5 to about 95 wt % of a vinyl-based copolymer and about 5 to about 95 wt % of a rubbery polymer.

In some embodiments, the rubber modified vinyl-based copolymer resin may include a vinyl-based copolymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of vinyl-based copolymer can be in a range from about any of the foregoing amounts to about any other of the foregoing amounts.

In some embodiments, the rubber modified vinyl-based copolymer resin may include a rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of rubbery polymer can be in a range from about any of the foregoing amounts to about any other of the foregoing amounts.

Examples of the rubbery polymer may include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymer (EPDM) rubbers, polyorganosiloxane/polyalkyl (meth)acrylate rubber composites, and the like, and combinations thereof.

The vinyl-based copolymer may be a polymer of about 50 to about 95 wt % of a first vinyl-based monomer including an aromatic vinyl monomer, an acrylic-based monomer, a heterocyclic monomer, or a combination thereof; and about 5 to about 50 wt % of a second vinyl-based monomer including an unsaturated nitrile monomer, an acrylic-based monomer, a heterocyclic monomer, or a combination thereof.

In some embodiments, the vinyl-based copolymer may include the first vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the first vinyl-based monomer can be in a range from about any of the foregoing amounts to about any other of the foregoing amounts.

In some embodiments, the vinyl-based copolymer may include the second vinyl-based monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 49, or 50 wt %. Further, according to some embodiments of the present invention, the amount of the second vinyl-based monomer can be in a range from about any of the foregoing amounts to about any other of the foregoing amounts.

Examples of the aromatic vinyl monomer may include without limitation styrene, C1 to C10 alkyl-substituted styrenes, halogen-substituted styrenes, and the like, and combinations thereof. Examples of the alkyl-substituted styrene may include without limitation o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth)acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof. In exemplary embodiments, methyl(meth)acrylate may be used. Examples of the (meth)acrylic acid ester may be (meth)acrylate, and the like.

Examples of the heterocyclic monomer may include without limitation maleic anhydride, C1-C10 alkyl- or phenyl N-substituted maleimides, and the like, and combinations thereof.

Examples of the unsaturated nitrile monomer may include without limitation acrylonitrile, methacrylonitrile, ethacrylonitrile, and the like, and combinations thereof.

When the rubber modified vinyl-based copolymer is prepared, a rubber particle may have a particle diameter of about 0.05 to about 4 μm to improve the impact resistance and surface characteristics of a molded product. When the particle diameter of the rubber particle ranges from about 0.05 to about 4 μm, excellent impact strength may be secured.

The rubber modified vinyl-based copolymer may be used singularly or as a mixture of two or more.

The rubber modified vinyl-based copolymer may include styrene, acrylonitrile, and optionally methyl(meth)acrylate graft-copolymerized on a butadiene rubber, an acrylic rubber, or a styrene/butadiene rubber as a copolymer.

The rubber modified vinyl-based copolymer may include methyl(meth)acrylate graft-copolymerized on a butadiene rubber, an acrylic rubber, or a styrene/butadiene rubber as a copolymer.

The rubber modified vinyl-based copolymer may include an acrylonitrile-butadiene-styrene copolymer resin.

The method of preparing the rubber modified vinyl-based copolymer is widely known to those skilled in the art, and any method among emulsion polymerization, suspension polymerization, solution polymerization and bulk polymerization may be used. Emulsion polymerization or bulk polymerization include adding the aforementioned aromatic vinyl monomer to a rubbery polymer and using a polymerization initiator.

The polyester resin is an aromatic polyester resin, and it may be a condensation-polymerized resin obtained from terephthalic acid or terephthalic acid alkyl ester, and a C2 to C10 glycol. As used herein, the alkyl may be a C1 to C10 alkyl.

Examples of the aromatic polyester resin may include without limitation polyethylene terephthalate resins, polytrimethylene terephthalate resins, polybutylene terephthalate resins, polyhexamethylene terephthalate resins, polycyclohexane dimethylene terephthalate resins, polyester resins modified into a non-crystalline resin by mixing the resins with another monomer, and the like, and combinations thereof. In exemplary embodiments a polyethylene terephthalate resin, a polytrimethylene terephthalate resin, a polybutylene terephthalate resin, and/or a non-crystalline polyethylene terephthalate resin may be used, for example, a polybutylene terephthalate resin and/or a polyethylene terephthalate resin may be used.

The polybutylene terephthalate resin is a condensation-polymerized polymer obtained through a direct ester reaction or an ester exchange reaction of 1,4-butanediol, and terephthalic acid or dimethyl terephthalate monomer.

The polybutylene terephthalate resin may be used in the form of a modified polybutylene terephthalate resin obtained by copolymerization and/or blending with a component to improve impact strength. For example, to increase the impact strength of the polybutylene terephthalate resin, the polybutylene terephthalate resin may be copolymerized with polytetramethylene glycol (PTMG), polyethylene glycol (PEG), and/or polypropylene glycol (PPG), and/or blended with a low molecular-weight aliphatic polyester and/or aliphatic polyamide.

The polybutylene terephthalate resin may have an intrinsic viscosity [η] of about 0.35 to about 1.5 dl/g, for example about 0.5 to about 1.3 dl/g in o-chloro phenol at 25° C. When the polybutylene terephthalate resin has an intrinsic viscosity [η] within the above range, the polybutylene terephthalate resin may have excellent mechanical strength and flowability.

The polyalkyl(meth)acrylate resin may be obtained by polymerizing a monomer including an alkyl(meth)acrylate through a known polymerization method, such as a suspension polymerization method, a bulk polymerization method, an emulsion polymerization method and the like.

The alkyl(meth)acrylate may have a C1 to C10 alkyl group. Examples of the alkyl(meth)acrylate may include without limitation methyl(meth)acrylate, ethyl(meth)acrylate, butyl(meth)acrylate, glycidyl(meth)acrylate, hydroxyethyl(meth)acrylate, and the like, and combinations thereof.

The polyalkyl(meth)acrylate may have a weight average molecular weight of about 10,000 to about 200,000 g/mol, for example about 15,000 to about 150,000 g/mol. When the polyalkyl(meth)acrylate has a weight average molecular weight within the above range, hydrolysis resistance, scratch resistance, flowability, and the like may be improved.

The styrenic resin may include a polymer including about 20 to about 100 wt % of an aromatic vinyl monomer; and about 0 to about 80 wt % of a vinyl-based monomer, such as but not limited to an unsaturated nitrile monomer, an acrylic-based monomer, a heterocyclic monomer, or a combination thereof.

In some embodiments, the styrenic resin may include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the amount of the aromatic vinyl monomer can be in a range from about any of the foregoing amounts to about any other of the foregoing amounts.

In some embodiments, the styrenic resin may include a vinyl-based monomer in an amount of 0 (the vinyl-based monomer is not present), about 0 (the vinyl-based monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the vinyl-based monomer can be in a range from about any of the foregoing amounts to about any other of the foregoing amounts.

Examples of the aromatic vinyl monomer may include without limitation styrene, C1 to C10 alkyl-substituted styrenes, halogen-substituted styrenes, and the like, and combinations thereof. Examples of the alkyl-substituted styrene may include without limitation o-ethyl styrene, m-ethyl styrene, p-ethyl styrene, α-methyl styrene, and the like, and combinations thereof.

The styrenic resin may include, for example, a rubber modified polystyrene resin (HIPS).

Examples of the polyolefin resin may include without limitation polyethylene (PE) resins, polypropylene (PP) resins, copolymers thereof, and the like, and combinations thereof.

The thermoplastic resin may be used in a form of mixed alloy of at least two kinds thereof. Examples thereof may include without limitation a mixture of polycarbonate and an acrylonitrile-butadiene-styrene (ABS) resin; a mixture of polycarbonate and an acrylate-styrene-acrylonitrile (ASA) resin, and the like.

In the first embodiment, the thermoplastic resin may be an acrylonitrile-butadiene-styrene (ABS) resin.

First Metal Particle

The thermoplastic resin composition includes first metal particles and may provide a metal-like texture to a molded product. The first metal particles may be plate-shaped.

The first metal particles may have a ratio of a short diameter relative to a long diameter in a range of about 1/50 to about 1/6, for example about 1/40 to about 1/6, about 1/30 to about 1/6, about 1/20 to about 1/6. The "short diameter" indicates the shortest diameter. The influence of the long diameter of the plate-shaped first metal particles and mutual support among the plate-shaped first metal particles may suppress changes in orientation of the particles resulting from the flow rate of the composition during injection molding.

Accordingly, the first metal particles may provide a thermoplastic resin composition that can have an excellent metal-like texture and few or no flow mark(s) and/or weld line(s).

In addition, the first metal particles may have a ratio of a thickness relative to a long diameter in a range of about 1/400 to about 1/2, for example about 1/350 to about 1/2, about 1/350 to about 1/10, about 1/350 to about 1/20. When the first metal particles have a ratio of a thickness relative to a long diameter within the above range, the thermoplastic resin may provide a highly-quality metal-like texture and simultaneously suppress orientation of the first metal particles by flow rate and thus, decrease defects due to the metal particles such as flow mark(s) and/or weld line(s) during injection molding.

The first metal particles may have a long diameter of about 30 to about 5,000 μm, for example about 30 to about 4,000 μm, about 30 to about 3,000 μm, about 30 to about 2,000 μm, about 30 to about 1,000 μm, about 30 to about 500 μm, and an average particle diameter of about 8 to about 100 μm. The long diameter range may be selected depending on the desired metal-like texture. Orientation changes of the first metal particles having a longer diameter within the claimed range may be suppressed during injection molding.

In addition, the average particle diameter of the first metal particles may be selected depending on the desired metal-like texture of a molded product and there is no particular limit to the range of average particle diameter.

The thermoplastic resin composition may include the first metal particle in an amount of about 0.2 parts by weight to about 5 parts by weight, for example about 0.2 to about 1 parts by weight, based on about 100 parts by weight of the thermoplastic resin. In some embodiments, the thermoplastic resin composition may include the first metal particle in an amount of 0.2, 0.3, 0.4, 0.5, 0.6, 0.7, 0.8, 0.9, 1, 2, 3, 4, or 5 parts by weight. Further, according to some embodiments of the present invention, the amount of the first metal particle can be in a range from about any of the foregoing amounts to about any other of the foregoing amounts.

When the thermoplastic resin composition includes the first metal particles in an amount within the above range, a metal-like texture required for a particular application may be obtained. However, when the first metal particles are included in an amount less than about 0.2 parts by weight, a sufficient metal-like texture may not be realized. When the first metal particles are included in an amount greater than about 5 parts by weight, the properties of the thermoplastic resin composition may be deteriorated.

The first metal particles may have a plate-shape and be a kind of sparkling particles having a flat surface reflecting a light. As used herein, the flat surface can have a degree of flatness such that the sparkling particles can be identified or seen with the naked eye, for example, the surface of a glass plate, the polished surface of a metal, and the like.

The first metal particles may be formed of a material such as but not limited to aluminum, bronze, gold, or a combination thereof. In exemplary embodiments, the first metal particle can include aluminum.

Inorganic Particle

The thermoplastic resin composition may further optionally include an inorganic particle which is different from the first metal particle.

The inorganic particle may include sparkling particles having a flat surface reflecting light that are different from the first metal particle described here. In this case, the flat surface is the same described above.

Examples of the inorganic particle may include without limitation glass particles, mica, graphite, pearl particles, and the like, and combinations thereof. In exemplary embodiments, the inorganic particle can be a glass particle.

The glass particle can have a plate structure so that it differs structurally from a glass fiber having a cylindrical shape. A cylindrical glass fiber does not provide a metal-like texture because it does not reflect light.

The cross-sectional configuration of the glass particle is not limited and can have, for example, can have a circular, oval, amorphous, or other cross-section.

The inorganic particle may have an average particle diameter of about 10 to about 200 μm and a thickness of about 0.5 to about 10 μm, and a cross-sectional area of about 80 to about 32,000 μm$^2$. When the inorganic particle has an average particle diameter, thickness, and cross-sectional area within the above ranges, a molded product having an excellent metal-like texture generating few or no flow mark(s) and/or weld line(s) may be obtained.

The thermoplastic resin composition may include the inorganic particle in an amount of about 0.1 to about 3.0 parts by weight, for example about 0.1 to about 1.2 parts by weight, based on about 100 parts by weight of the thermoplastic resin. In some embodiments, the thermoplastic resin composition may include the inorganic particle in an amount of 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 parts by weight. Further, according to some embodiments of the present invention, the amount of the inorganic particle can be in a range from about any of the foregoing amounts to about any other of the foregoing amounts.

When the thermoplastic resin composition includes the inorganic particle in an amount within the above ranges, a molded product having excellent impact strength and excellent metal-like texture with few or no flow mark(s) and/or weld line(s) may be provided.

Other Additive(s)

The thermoplastic resin composition may further include one or more other additives. Examples of the additives include without limitation antibacterial agents, heat stabilizers, antioxidants, release agents, light stabilizers, surfactants, coupling agents, plasticizers, admixtures colorants, stabilizers, lubricants, anti-static agents, coloring aids, flame retardants, weather-resistance agents, ultraviolet (UV) absorbers, ultraviolet (UV) blocking agents, nucleating agents, adhesion aids, adhesives, and the like, and combinations thereof.

Examples of the antioxidant may include without limitation phenol type antioxidants, phosphite type antioxidants, thioether type antioxidants, amine type antioxidants, and the like, and combinations thereof.

Examples of the release agent may include without limitation fluorine-containing polymers, silicon oils, stearic acid metal salts, montanic acid metal salts, montanic ester waxes, polyethylene waxes, and the like, and combinations thereof.

Examples of the weather-resistance agent may include without limitation benzophenone-type weather-resistance agents, amine-type weather-resistance agents, and the like, and combinations thereof.

Examples of the colorant may include without limitation dyes, pigments, and the like, and combinations thereof.

Examples of the ultraviolet (UV) ray blocking agent may include without limitation titanium dioxide ($TiO_2$), carbon black, and the like, and combinations thereof.

Examples of the nucleating agent may include without limitation talc, clay, and the like, and combinations thereof.

The additive may be included in a predetermined amount as long as it does not deteriorate the properties of the thermoplastic resin composition. In exemplary embodiments, the thermoplastic resin composition may include the additive(s) in an amount of less than or equal to about 40 parts by weight, for example about 0.1 to about 30 parts by weight based on about 100 parts by weight of the thermoplastic resin.

Second Embodiment

According to another embodiment of the present invention, provided is a thermoplastic resin composition that includes a thermoplastic resin, a plate-shaped second metal particle, and plate-shaped mica, wherein the plate-shaped mica is included in an amount of about 0.01 to about 4.9 parts by weight based on about 100 parts by weight of the thermoplastic resin.

The second metal particle and mica may have a plate shape.

The thermoplastic resin composition can generate few or no flow mark(s) and/or weld lines during injection molding, and thus can provide a molded product that can have an excellent metal-like texture.

Accordingly, the thermoplastic resin composition may be used to make a molded product that can have an excellent appearance, for example, an exterior plastic product for electronic parts, automobile parts and the like, without an additional painting process.

Hereinafter each component included in the thermoplastic resin composition is detailed described.

Thermoplastic Resin

The thermoplastic resin is the same as in the first embodiment and accordingly a detailed description thereof is not provided.

In exemplary embodiments, the thermoplastic resin may include a polycarbonate resin, a rubber modified vinyl-based copolymer resin, a polyester resin, a polyalkyl(meth)acrylate resin, a styrenic resin, a polyolefin resin, or a combination thereof.

For example, the thermoplastic resin may be an acrylonitrile-butadiene-styrene (ABS) resin.

Second Metal Particle

The thermoplastic resin composition includes plate-shaped second metal particles which may provide a metal-like texture to a molded product.

The plate-shaped second metal particles may have a ratio of a thickness relative to a long diameter in a range of about 1/80 to about 1/1, for example about 1/80 to about 1/10, about 1/80 to about 1/20, about 1/80 to about 1/30. The influence of the long diameter of the plate-shaped second metal particles and mutual support among the plate-shaped second metal particles may suppress changes in the orientation of the particles resulting from the flow rate of the composition during injection molding.

Accordingly, the thermoplastic resin composition may provide a molded product that can have an excellent metal-like texture and few or no flow mark(s) and/or weld line(s).

The plate-shaped second metal particles may have a long diameter of about 5 to about 100 μm. The long diameter range may be selected depending on desired metal-like texture. Orientation changes of the plate-shaped second metal particles having a longer diameter within the claimed range may be suppressed during injection molding.

In addition, the average particle diameter of the plate-shaped second metal particles may be selected depending on the desired metal-like texture of a molded product has and there is no particular limit to the range of average particle diameter.

The thermoplastic resin composition may include the plate-shaped second metal particle in an amount of about 0.01 parts by weight to about 4 parts by weight based on about 100 parts by weight of the thermoplastic resin. In exemplary embodiments, the thermoplastic resin composition may include the plate-shaped second metal particles in an amount of about 0.1 to about 2 parts by weight, about 0.2 to about 1 part by weight, or about 0.3 to about 0.8 parts by weight based on about 100 parts by weight of the thermoplastic resin. In some embodiments, the thermoplastic resin composition may include the plate-shaped second metal particles in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, or 4 parts by weight. Further, according to some embodiments of the present invention, the amount of the plate-shaped second metal particles can be in a range from about any of the foregoing amounts to about any other of the foregoing amounts.

When the thermoplastic resin composition includes the plate-shaped second metal particles in an amount within the above range, a desired metal-like texture may be obtained. However, when the plate-shaped second metal particles are included in an amount less than about 0.01 parts by weight, an insufficient metal-like texture can result. If the plate-shaped second metal particles are included in an amount greater than about 4 parts by weight, properties of the thermoplastic resin composition may be deteriorated.

The plate-shaped second metal particles may be one kind of sparkling particles having a flat surface reflecting a light. As used herein, the flat surface has a degree of flatness so that the sparkling particles can be identified or seen with the naked eye, for example, the surface of a glass plate, the polished surface of a metal, and the like.

The plate-shaped second metal particles may be formed of a material such as but not limited to aluminum, bronze, gold, or a combination thereof. In exemplary embodiments, the plate-shaped second metal particles can include aluminum.

Mica

According to one embodiment of the present invention, mica may be plate-shaped mica. The plate-shaped second metal particles may efficiently provide a metal-like texture on the surface of a molded product due to the plate-shaped mica.

The thermoplastic resin composition can include the plate-shaped mica in an amount of about 0.01 to about 4.9 parts by weight, for example about 0.01 to about 4 parts by weight, as another example about 0.1 to about 4 parts by weight, as another example about 0.2 to about 3.5 parts by weight, and as another example about 0.3 to about 3 parts by weight, based on about 100 parts by weight of the thermoplastic resin. In some embodiments, the thermoplastic resin composition may include the plate-shaped mica in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, or 4.9 parts by weight. Further, according to some embodiments of the present invention, the amount of the plate-shaped mica can be in a range from about any of the foregoing amounts to about any other of the foregoing amounts.

When the thermoplastic resin composition includes plate-shaped mica in an amount greater than or equal to 5 parts by weight based on about 100 parts by weight of the thermoplastic resin, impact strength of a molded product may be seriously deteriorated.

The plate-shaped mica may be coated with $TiO_2$ on the surface.

The plate-shaped mica may have a ratio of a thickness relative to a long diameter in a range of about 1/100 to about 1/2, for example about 1/80 to about 1/2, about 1/60 to about 1/2, about 1/40 to about 1/2. When the plate-shaped mica has a ratio of a thickness relative to a long diameter with the above range, luminance by the second plate-shaped metal particles may be effectively improved.

The plate-shaped mica may have an average particle diameter ranging from about 10 to about 200 μm, a thickness ranging from about 0.5 to about 10 μm, and a cross-sectional area ranging from about 80 to about 32,000 μm². When the plate-shaped mica has an average particle diameter, a thickness, and a cross-sectional area within the above ranges, a molded product may have an excellent metal-like texture and few or no flow mark(s) and/or weld line(s).

Other Additive(s)

The thermoplastic resin composition may further include one or more other additives. The description therefore is the same as the first embodiment, and thus, a detailed description thereof is not provided.

Third Embodiment

According to another embodiment of the present invention, provided is a thermoplastic resin composition that includes a thermoplastic resin, a plate-shaped third metal particle or a spherical fourth metal particle, and thermally expandable particulate. The thermoplastic resin composition may cause few or no flow mark(s) and/or weld line(s) and thus can provide an excellent appearance having a metal-like texture. Accordingly, the thermoplastic resin composition can be used to make a molded product that can have an excellent appearance for example, plastic exterior products such as electronic parts, automobile parts, and the like without a painting process.

Hereinafter, each component included in the thermoplastic resin composition is specifically illustrated.

Thermoplastic Resin

The thermoplastic resin is the same as in the first embodiment, and accordingly a detailed description thereof is not provided.

In exemplary embodiments, the thermoplastic resin may be a polycarbonate resin, a rubber modified vinyl-based copolymer resin, a polyester resin, a polyalkyl(meth)acrylate resin, a styrenic resin, a polyolefin resin, or a combination thereof.

Plate-Shaped Third Metal Particle or Spherical Fourth Metal Particle

The thermoplastic resin composition includes the plate-shaped third metal particles or spherical fourth metal particles. The thermoplastic resin composition of this embodiment can accordingly provide a metal-like texture to a molded product.

The plate-shaped third metal particles or spherical fourth metal particles may be a kind of sparkling particles.

The plate-shaped third metal particles can have a flat surface reflecting a light. As used herein, the flat surface has a degree of flatness so that the sparkling particles can identified or seen with the naked eye, for example, the surface of a glass plate, the polished surface of a metal, and the like.

The plate-shaped third metal particles or the spherical third fourth particles may be formed of a material including without limitation aluminum, bronze, gold, or a combination thereof, for example, aluminum.

The thermoplastic resin composition may include the plate-shaped third metal particles or the spherical fourth metal particles in an amount of about 0.01 to about 10 parts by weight, for example about 0.5 to about 3 parts by weight, based on about 100 parts by weight of the thermoplastic resin. In some embodiments, the thermoplastic resin composition may include the plate-shaped third metal particles or the spherical fourth metal particles in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the plate-shaped third metal particles or the spherical fourth metal particles can be in a range from about any of the foregoing amounts to about any other of the foregoing amounts.

When the thermoplastic resin composition includes the plate-shaped third metal particles or the spherical fourth metal particles in an amount within the above range, the composition can provide a desired metal-like texture.

The plate-shaped third metal particles may have a ratio of a thickness relative to a long diameter ranging from about 1/80 to about 1, for example, about 1/40 to about 1/5. When the plate-shaped third metal particles have a size within the above range, the thermoplastic resin composition may cause few or no flow mark(s) and/or weld line(s) and thus can produce a molded product that can have an excellent metal-like texture.

The plate-shaped third metal particles may have long diameter ranging from about 5 to about 100 μm, for example about 5 to about 90 μm, about 10 to about 90 μm, about 15 to about 90 μm.

The cross-sectional area of the plate-shaped third metal particles may be in a range of about 100 to about 22,500 μm².

The plate-shaped third metal particles may have a thickness ranging from about 0.05 to about 20 μm, for example about 0.1 to about 5 μm.

The spherical fourth metal particles may have an average diameter ranging from about 5 to about 100 μm, for example about 5 to about 90 μm, about 10 to about 90 μm, about 15 to about 90 μm.

Thermally Expandable Particulate

The thermally expandable particulate may be a polymer particle including a hydrocarbon foamable compound therein. The hydrocarbon foamable compound may be gasified or thermally decomposed and thus can generate gas at greater than or equal to a predetermined temperature and form a hollow space inside the thermally expandable particulate, while the polymer particle expands and forms a shell. As used herein, the polymer particle is very soft and elastic and thus not destroyed when expanded. In general, thermally expandable particulates are destroyed during the expansion, which can deteriorate the surface appearance of a molded product. However, the polymer particle used in the invention is not destroyed during the expansion and thus can provide an excellent surface appearance of a molded product.

The thermally expandable particulates are heated and expanded during molding of the thermoplastic resin composition, and the thermoplastic resin composition including the thermally expandable particulates may form a molded product as a foam.

The thermally expandable particulates can have an expansion starting temperature (Tstart), a maximum expansion temperature (Tmax), and the like determined by the boiling point of the hydrocarbon foamable compound and the glass transition temperature (Tg) of the polymer forming a shell. In addition, the thermally expandable particulates may have a maximum expansion displacement (Dmax) regulated depending on the amount of the hydrocarbon foamable compound and gas transmission (gas barrier) property of the polymer. For example, the polymer forming a shell during the expansion may have a glass transition temperature (Tg) ranging from about 30 to about 120° C., and accordingly, the thermally expandable particulates may be prepared to initiating the expansion at a temperature ranging from about 110 to about 180° C.

The polymer forming a shell during the expansion may be a thermoplastic resin capable of being softened by internally expansion gas at the expansion initiation temperature. Examples of the polymer may include without limitation acrylic-based resins, vinylidene chloride-based resins, acrylonitrile-based resins, ABS resins, polyethylene, polyethylene terephthalate, polypropylene, polystyrene, polyvinyl chloride resin, acetal resin, cellulose ester, acetic acid cellulose, fluorine resins, methylpentent polymer, and the like, and combinations thereof. Examples of the polymer may include without limitation acrylonitrile, methacrylonitrile, methyl methacrylate, methyl acrylate, ethyl acrylate, propyl acrylate, n-butyl acrylate, isobutyl acrylate, t-butyl acrylate, 2-ethylhexyl acrylate, n-octyl acrylate, lauryl acrylate, stearyl acrylate, 2-hydroxyethyl acrylate, polyethylene glycol acrylate, methoxypolyethylene glycol acrylate, glycidyl acrylate, dimethylaminoethyl acrylate, diethylaminoethyl acrylate, vinylidene chloride, butadiene, styrene, p- or m- methylstyrene, p- or m-ethylstyrene, p- or m-chlorostyrene, p- or m-chloromethylstyrene, styrenesulfonic acid, p- or m- t-butoxystyrene, vinyl acetate, vinyl propinonate, vinyl butyrate, vinyl ether, allyl butyl ether, allyl glycidyl ether, unsaturated carboxylic acid including (meth)acrylic acid or maleic acid, alkyl(meth)acrylamide, and the like, and combinations thereof.

The polymer may be selected depending on a desired use such as softening temperature, heat resistance, chemical resistance, and the like. For example, a copolymer including vinylidene chloride can have excellent gas barrier property, and another copolymer including a nitrile-based monomer in an amount of greater than or equal to about 80 wt % can have excellent heat and chemical resistances.

The hydrocarbon foamable compound included in the thermally expandable particulate does not dissolve the polymer forming a shell during the expansion but has a boiling point of less than or equal to about 100° C. The hydrocarbon foamable compound may in general include a liquid material having a low boiling point, so called, a volatile expansion agent or a solid material thermally decomposed and producing gas. Examples of the hydrocarbon foamable compound may include without limitation butane, pentane, hexane, heptane, halogen derivatives of methane, tetraalkyl silane, hydrofluoroether, azobisisobutyronitrile (AIBN) thermally decomposed and changed into gas, and the like and combinations thereof.

The hydrocarbon foamable compound may be included in various amounts in the thermally expandable particulates depending on the end use. In exemplary embodiments, the thermally expandable particulates can include the hydrocarbon foamable compound in an amount ranging from about 0.5 to about 15 wt %, for example about 1 to about 10 wt %, based on the total weight of the thermally expandable particulates.

The thermally expandable particulates may be prepared in a suspension polymerization method by mechanically dispersing a mixture of a monomer and a hydrocarbon foamable compound, and the like into a non-compatible liquid such as water and polymerizing monomer droplets.

The thermally expandable particulates having excellent expansion property and a uniform diameter according to the present invention may have an average particle diameter ranging from about 5 to about 60 μm, for example, about 10 to about 50 μm, about 20 to about 40 μm, about 20 to about 35 μm before the expansion. The thermally expandable particulates having an average particle diameter ranging from about 5 to about 60 μm may not be destroyed and can also form an outer layer having an appropriate thickness and thus, a fast thermal expansion behavior.

The thermally expandable particulates can have a maximum expansion temperature ranging from about 150 to about 280° C., for example about 180 to about 280° C., about 180 to about 270° C., about 200 to about 280° C., about 220 to about 280° C., depending on a desired use. For example, the thermoplastic resin composition may be prepared to have less than or equal to about 20° C. of the maximum expansion temperature difference among the thermally expandable particulates. This thermoplastic resin composition may be easily controlled during the injection molding process, since the thermally expandable particulates can be expanded and foamed within a narrow temperature range.

At the maximum expansion temperature, the thermally expandable particulates may have a volume of about 10 to about 100 times larger, for example, about 30 to about 60 times larger, than the volume of the thermally expandable particulates before expansion. When the thermoplastic resin composition including the thermally expandable particulates is molded by injection molding and the like, the thermally expandable particulates can be expanded and then included in a molded product. The resultant thermally expanded particulates included in the molded product may have about 1.05 to about 20 times larger volume, for example, about 2 to about 15 times larger volume, than the thermally expandable particulates before expansion.

The thermally expandable particulates along with the aforementioned metal particles are included in the thermoplastic resin composition and may improve orientation of the metal particles. In general, plate-shaped metal particles have a drawback of deteriorating metal-like texture and looking darker when a thin side of the plate-shaped metal particle, that is, its edge, is oriented toward the surface of a molded product. Accordingly, the plate-shaped third metal particles should be aligned in a same direction so that the edges of the plate-shaped third metal particles are not facing toward the surface of the molded product during molding, so as to improve the metal-like texture of the molded product. When the thermally expandable particulates are mixed with the plate-shaped third metal particles, the thermally expandable particulates can be expanded into a spherical shape during molding and can help align the plate-shaped third metal particles so that the edges thereof are not facing toward the surface of the molded product. In other words, the thermally expandable particulates can be positioned between the plates of each plate-shaped metal particle and can help uniformly align the plate-shaped metal particles. As a result, the thermoplastic resin composition including both the thermally expandable particulates and the plate-shaped third metal particles may provide an excellent metal-like texture to the molded product and can decrease or eliminate flow mark(s) and/or weld line(s) in the molded product, since the plate-shaped third metal particles can be uniformly aligned.

The thermoplastic resin composition can include the thermally expandable particulates in an amount of about 0.5 to about 15 parts by weight, for example, about 1 to about 10 parts by weight, based on about 100 parts by weight of the thermoplastic resin. In some embodiments, the thermoplastic resin composition may include the thermally expandable particulates in an amount of 0.5, 0.6, 0.7, 0.8, 0.9, 1, 2, 3, 4, 5, 6, 7, 8, 9, 10, 11, 12, 13, 14, or 15 parts by weight. Further, according to some embodiments of the present invention, the amount of the thermally expandable particulates can be in a range from about any of the foregoing amounts to about any other of the foregoing amounts.

When the thermoplastic resin composition includes the thermally expandable particulates in an amount within the above range, the thermally expandable particulates may improve orientation of the metal particles and thus help provide a metal-like texture and/or appropriate surface gloss of a molded product.

Inorganic Particle

The thermoplastic resin composition may further inorganic particles. The description therefore is the same as in the first embodiment, and thus a detailed description thereof is not provided.

The thermoplastic resin composition may include the inorganic particles in an amount of about 0.05 to about 10 parts by weight, for example about 0.2 to about 3 parts by weight, based on about 100 parts by weight of the thermoplastic resin. In some embodiments, the thermoplastic resin composition may include the inorganic particles in an amount of 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the inorganic particles can be in a range from about any of the foregoing amounts to about any other of the foregoing amounts.

When the thermoplastic resin composition includes the inorganic particles in an amount within the above range, a molded product can have excellent impact strength, few or no flow mark(s) and/or weld line(s), and thus, can have an excellent metal-like texture.

Other Additive(s)

The thermoplastic resin composition may further include one or more other additives. The description therefore is the same as the first embodiment and thus a detailed description thereof is not provided.

The thermoplastic resin composition according to first to third embodiments may be prepared using any well-known method for preparing a thermoplastic resin composition. For example, each component according to each embodiment of the present invention can be simultaneously mixed with one or more optional additives. The mixture can be melt-extruded and prepared into pellets.

According to another embodiment of the present invention, a molded product fabricated using the thermoplastic resin compositions of the foregoing embodiments is provided. In other words, the thermoplastic resin compositions can be used to manufacture a molded product using various conventional processes such as injection molding, blow molding, extrusion molding, compression molding, and the like. The compositions may be used to make a molded product having few or no flow mark(s) and/or weld line(s) and having appearance with a metal-like texture, such as plastic exterior products for electronic parts, automobile parts, and the like. In addition, the molded product formed from the thermoplastic resin compositions including metal particles can have an excellent metal-like texture and thus does not need an additional painting process to apply the metal-like texture.

The density of the molded product formed from the thermoplastic resin composition according to the third embodiment may be regulated by the amount of the thermally expandable particulates and an expansion temperature, while the metal-like texture of the molded product may be determined by the amount of the metal particles. The molded product can have a high-quality metal-like texture since the orientation of the metal particles can be regulated considering that the same amount of the metal particles is used.

The following examples illustrate this invention in more detail. However, it is understood that this invention is not limited by these examples.

EXAMPLES 1 TO 5 AND COMPARATIVE EXAMPLES 1 TO 6

Thermoplastic resin compositions are prepared as shown in the following Table 1.

TABLE 1

| Component | unit | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| (A) g-ABS resin | wt % | | | 18 | | | | | 18 | | | |
| (B) g-ABS resin | wt % | | | 10 | | | | | 10 | | | |
| (C) SAN resin | wt % | | | 52 | | | | | 52 | | | |
| (D) SAN resin | wt % | | | 20 | | | | | 20 | | | |
| (E) Metal particle-1 | parts | 0.5 | — | 0.4 | 0.2 | 0.3 | — | — | 0.3 | — | — | — |
| (F) Metal particle-2 | parts | — | 0.5 | 0.2 | 0.4 | 0.3 | — | — | — | 0.3 | — | — |
| (G) Metal particle-3 | parts | — | — | — | — | — | 0.5 | — | 0.3 | — | 0.3 | — |
| (H) Metal particle-4 | parts | — | — | — | — | — | — | 0.5 | — | 0.3 | 0.3 | — |
| (I) Metal particle-5 | parts | | | | | | | | | | | 0.5 |

The inorganic particles may be mixed with the plate-shaped third metal particles or spherical shaped fourth metal particles in a weight ratio ranging from about 1:5 to about 5:1, for example about 1:2 to about 2:1, in the thermoplastic resin composition. When the inorganic particles are mixed with the plate-shaped third metal particles or spherical shaped fourth metal particles in an amount within the above ratio range, a molded product may have few or no flow mark(s) and/or weld line(s) as well as excellent impact strength and can have an excellent metal-like texture.

Each component shown in Table 1 is as follows.

(A) g-ABS Resin (Cheil Industries Inc.)

A grafted ABS (acrylonitrile-butadiene-styrene) resin including 42 wt % of a copolymer of acrylonitrile and styrene grafted onto 58 wt % of a butadiene rubber is used. The copolymer is copolymerized from 25 wt % of acrylonitrile and 75 wt % of styrene.

(B) g-ABS Resin (Cheil Industries Inc.)

A grafted ABS resin including 52 wt % of a copolymer of acrylonitrile and styrene onto 48 wt % of a butadiene rubber is used. The copolymer is copolymerized from 29 wt % of acrylonitrile and 71 wt % of styrene.

(C) SAN Resin (Cheil Industries Inc.)

A SAN (styrene-acrylonitrile) resin is copolymerized from 32 wt % of acrylonitrile and 68 wt % of styrene and has a weight average molecular weight of about 120,000 g/mol.

(D) SAN Resin (Cheil Industries Inc.)

A SAN resin is copolymerized from 24 wt % of acrylonitrile and 76 wt % of styrene and has a weight average molecular weight of about 150,000 g/mol.

(E) Metal Particle-1 (AVL Metal Powders)

Amorphous plate-shaped aluminum particles having an average long diameter of 30 μm, an average short diameter of 5 μm, and an average thickness of 0.1 μm are used.

(F) Metal Particle-2 (Yamato Metal Co.)

Amorphous plate-shaped aluminum particles having an average long diameter of 60 μm, an average short diameter of 10 μm, and an average thickness of 2.2 μm are used.

(G) Metal Particle-3 (Yamato Metal Co.)

Amorphous plate-shaped aluminum particles having an average long diameter of 60 μm, an average short diameter of 20 μm, and an average thickness of 4 μm are used.

(H) Metal Particle-4 (Silberline Manufacturing Co.)

Amorphous plate-shaped aluminum particles having an average long diameter of 17 μm, an average short diameter of 10 μm, and an average thickness of 0.5 μm are used.

(I) Metal Particle-5 (Yamato Metal Co.)

Amorphous plate-shaped aluminum particles having an average long diameter of 100 μm, an average short diameter of 20 μm, and an average thickness of 2 μm are used.

The thermoplastic resin compositions according to Examples 1 to 5 and Comparative Examples 1 to 6 are prepared using the types and amounts of components shown in Table 1 and then extruded using a general twin-screw extruder at a temperature range of about 180 to about 230° C. to provide extruded pellets. In Table 1, the amounts (A), (B), (C), and (D) (i.e. (A)+(B)+(C)+(D))=100 wt %. Each (A), (B), (C), and (D) has a unit of wt %. The aforementioned metal particles are present in a relative part by weight based on the (A)+(B)+(C)+(D)=100 parts by weight.

The pellets obtained from Examples 1 to 5 and Comparative Examples 1 to 6 are dried at a temperature of about 80° C. for about 4 hours, and a ASTM dumbbell-like specimen is injection molded using an injection molding machine having a 6 Oz injection capacity by setting a cylinder temperature of about 210 to about 240° C., a mold temperature of about 60° C., a molding cycle time at about 30 seconds to provide a specimen.

The obtained specimen is measured for appearance properties, and the results are shown in the following Table 2.

TABLE 2

| | | unit | Examples | | | | | Comparative Examples | | | | | |
|---|---|---|---|---|---|---|---|---|---|---|---|---|---|
| | | | 1 | 2 | 3 | 4 | 5 | 1 | 2 | 3 | 4 | 5 | 6 |
| Appearance | Metal-like texture (Flop Index) | — | 12.2 | 5.6 | 11.7 | 10.9 | 12.8 | 4.6 | 9.7 | 6.5 | 7.9 | 6.0 | 7.6 |
| | Flow mark | — | ○ | ⊚ | ○ | ⊚ | ⊚ | ○ | Δ | ○ | Δ | Δ | ○ |
| | Weld line | — | ○ | ⊚ | ○ | ⊚ | ⊚ | ○ | Δ | ○ | X | X | ○ |

The references for evaluating the appearance properties in Table 2 are as follows.

Metal-like Texture

The flop index is measured using a spectrophotometer (Manufacturer: BYK, Model name: BYK Mac). The flip-flop effect, which is inherent texture of aluminum particle, is evaluated by coordinating three angles of 15°, 45° and 110°, and the results are shown in Table 2.

Flow Mark and Weld Line

Since a mold having two gates is used in the injection molding, a weld line might be produced. The appearance of the molded product is observed by the naked eye and evaluated according to the following basis, and the results are shown in Table 2.

⊚: no discoloring in weld line or flow mark
○: no flow mark, but little discoloring in weld line
Δ: discoloring in weld line and flow mark
x: seriously discoloring in weld line and flow mark Referring to Table 2, it is confirmed that the thermoplastic resin compositions according to Examples 1 to 5 have an excellent metal-like texture and decreased flow mark and weld line.

EXAMPLES 6 TO 12 AND COMPARATIVE EXAMPLES 7 TO 12

Thermoplastic resin compositions are prepared as shown in the following Table 3.

TABLE 3

| | Examples | | | | | | | Comparative Examples | | | | | |
|---|---|---|---|---|---|---|---|---|---|---|---|---|---|
| | 6 | 7 | 8 | 9 | 10 | 11 | 12 | 7 | 8 | 9 | 10 | 11 | 12 |
| (A) Thermoplastic resin (parts) | 100 | 100 | 100 | 100 | 100 | 100 | 100 | 100 | 100 | 100 | 100 | 100 | 100 |

TABLE 3-continued

|  |  | Examples | | | | | | | Comparative Examples | | | | | |
| --- | --- | --- | --- | --- | --- | --- | --- | --- | --- | --- | --- | --- | --- | --- |
|  |  | 6 | 7 | 8 | 9 | 10 | 11 | 12 | 7 | 8 | 9 | 10 | 11 | 12 |
| (B) Plate-shaped metal particle | (B-1) (parts) | 0.5 | 0.5 | 0.5 | 0.5 | 0.5 | — | — | 0.5 | 0.5 | 0.5 | — | — | 0.5 |
|  | (B-2) (parts) | — | — | — | — | — | 0.5 | 0.5 | — | — | — | 0.5 | 0.5 | — |
| (C) Mica (parts) |  | 0.3 | 0.5 | 1 | 2 | 3 | 1 | 3 | — | — | — | — | — | 5 |
| (D) TiO$_2$ (parts) |  | — | — | — | — | — | — | — | 0.1 | 0.3 | 1 | 1 | 3 | — |

Each component shown in Table 3 is as follows:

(A) Thermoplastic Resin

ABS resin is used. The weight portion of butadiene rubber:styrene:acrylonitrile in ABS resin is 17:62:21. (Cheil Industries Inc.)

(B) Metal Particle (B-1) Plate-shaped aluminum particles having an average long diameter of 14 μm and an average thickness of 0.2 μm are used. (Silberline Manufacturing Co.)

(B-2) Plate-shaped aluminum particles having an average long diameter of 8 μm and an average thickness of 0.1 μm are used. (Yamato Metal Co.)

(C) Mica

Plate-shaped synthesized mica having an average long diameter of 30 μm and an average thickness of 5 μm are used. (Merk Performance Materials)

(D) TiO$_2$

Titanium dioxide having an average particle diameter of 0.25 μm is used. (Kronos Co.)

The thermoplastic resin compositions of Examples 6 to 12 and Comparative Examples 7 to 12 are prepared using the types and amounts of components shown in Table 3 and then extruded using a general twin-screw extruder at a temperature range of about 180 to about 240° C. to provide extruded pellets.

The pellets obtained from Examples 6 to 12 and Comparative Examples 7 to 12 are dried at about 80° C. for about 4 hours, and a ASTM dumbbell-like specimen is injection molded using an injection molding machine having a 6 Oz injection capacity by setting a cylinder temperature of about 210 to about 250° C., a mold temperature of about 80 to 120° C., a molding cycle time at about 30 seconds to provide a specimen.

The obtained specimen is measured for the physical and appearance properties, and the results are shown in the following Table 4.

Impact Strength

The Izod impact strength of the specimen is measured (mechanical strength evaluation) according to a standard measurement method, ASTM D256.

Referring to Table 4, the thermoplastic resin compositions according to Examples 6 to 12 have an excellent metal-like texture, decreased flow mark and weld line and excellent impact strength.

EXAMPLES 13 TO 21 AND COMPARATIVE EXAMPLES 13 TO 18

Each component used to prepare the thermoplastic resin compositions according to Examples 13 to 21 and Comparative Examples 13 to 18 are as follows.

(A) Thermoplastic Resin

MABS (methylmethacylate-acrylonitrile-butadiene-styrene) resin is used. (SF-0950 grade of Cheil Industries Inc.)

(B) Plate-shaped Metal Particle (B-1) Plate-shaped metal particles having an average cross-sectional area of 1,200 μm$^2$, an average long diameter of 20 μm, and an average thickness of 1 μm are used.

(B-2) Plate-shaped metal particles having an average cross-sectional area of 1,200 μm$^2$, an average long diameter of 80 μm, and a thickness of 1 μm are used.

(C) Thermally Expandable Particulate

Thermally expandable particulate having an average particle diameter of 30 μm and a maximum expansion temperature of 260° C. is used. (Microsphere F-260 D grade of Matsumoto Co.)

(D) Expansion Agent

CELLCOM-EMS grade of Keumyang Co. is used.

The thermoplastic resin compositions of Examples 13 to 21 and Comparative Examples 13 to 18 are prepared using the types and amounts of components shown in Table 5 and then

TABLE 4

|  |  | Examples | | | | | | | Comparative Examples | | | | | |
| --- | --- | --- | --- | --- | --- | --- | --- | --- | --- | --- | --- | --- | --- | --- |
|  | Unit | 6 | 7 | 8 | 9 | 10 | 11 | 12 | 7 | 8 | 9 | 10 | 11 | 12 |
| Metal-like texture (Flop Index) | — | 6 | 6 | 7 | 8 | 8 | 11 | 12 | 6 | 5 | 4 | 9 | 7 | 8 |
| Luminance (L) | — | 71 | 72 | 74 | 76 | 78 | 73 | 76 | 68 | 72 | 74 | 73 | 77 | 79 |
| Impact strength (1/8 inch) | kgf · cm/cm | 22 | 22 | 21 | 20 | 19 | 22 | 20 | 22 | 22 | 21 | 21 | 20 | 17 |

The references for evaluating the physical and appearance properties in Table 4 are as follows.

Metal-like Texture and Luminance

The flop index is measured by using a spectrophotometer (manufacturer: BYK, model name: BYK Mac). The flip-flop effect, which is inherent texture of aluminum particle, is evaluated by coordinating three angles of 15°, 45° and 110°, and the results are shown in Table 4.

extruded in a general twin-screw extruder at a temperature of about 230° C. to provide extruded pellets.

The pellets obtained from Examples 13 to 21 and Comparative Examples 13 to 18 are dried at about 80° C. for about 4 hours, and a ASTM dumbbell-like specimen is injection molded using an injection molding machine having a 6 Oz injection capacity by setting a cylinder temperature of about 240° C., a mold temperature of about 80° C., a molding cycle time at about 30 seconds to provide a specimen. The obtained specimen is measured for the physical and appearance properties, and the results are shown in the following Table 5.

TABLE 5

| | | Examples | | | | | | | | | Comparative Examples | | | | | |
|---|---|---|---|---|---|---|---|---|---|---|---|---|---|---|---|---|
| | | 13 | 14 | 15 | 16 | 17 | 18 | 19 | 20 | 21 | 13 | 14 | 15 | 16 | 17 | 18 |
| (A) Thermoplastic resin (parts) | | 100 | 100 | 100 | 100 | 100 | 100 | 100 | 100 | 100 | 100 | 100 | 100 | 100 | 100 | 100 |
| (B) Plate-shaped metal particle | (B-1) (parts) | 0.5 | 1 | 0.5 | 1 | — | — | — | — | 0.5 | 0.5 | 1 | — | — | 0.5 | 1 |
| | (B-2) (parts) | — | — | — | — | 0.5 | 1 | 0.5 | 1 | — | — | — | 0.5 | 1 | 0.5 | — |
| (C) Thermally expandable particulate | | 3 | 3 | 5 | 5 | 3 | 3 | 5 | 5 | 1 | — | — | — | — | — | — |
| (D) Expansion agent | | — | — | — | — | — | — | — | — | — | — | — | — | — | — | 3 |
| Appearance | Metal-like texture (Flop Index) | 13 | 14 | 11 | 12 | 9 | 10 | 8 | 9 | 14 | 14 | 14 | 12 | 12 | 14 | 3 |
| | Flow mark | O | O | ◎ | ◎ | O | O | ◎ | ◎ | O | X | X | X | X | X | O |
| | Weld line | O | O | ◎ | O | O | O | O | O | O | X | X | X | X | X | O |
| Weight of molded product (g) | | 60.8 | 61.2 | 57.3 | 58.1 | 60.5 | 62.3 | 56.9 | 57.5 | 74.3 | 81.6 | 81.7 | 81.3 | 81.4 | 80.8 | 60.8 |

Referring to Table 5, each molded product fabricated using the thermoplastic resin composition of Example 13 to 21 has an excellent metal-like texture and decreased flow mark and weld line. In contrast, each molded product fabricated using the thermoplastic resin compositions including no thermally-expandable particulates according to Comparative Examples 13 to 18 has no flow mark and weld line decreases, and a molded product fabricated using a expansion agent instead of the thermally expandable particulate according to Comparative Example 18 is excellent in terms of flow mark and weld line decreases but remarkably deteriorated metal-like texture.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising
   a thermoplastic resin, wherein the thermoplastic resin is a rubber modified vinyl-based copolymer resin, and
   a first metal particle,
   wherein the first metal particle has a ratio of a short diameter relative to a long diameter of about 1/30 to about 1/6, and
   wherein the first metal particle is present in an amount of about 0.2 parts by weight to about 5 parts by weight based on about 100 parts by weight of the thermoplastic resin.

2. The thermoplastic resin composition of claim 1, wherein the first metal particle has a ratio of a thickness relative to a long diameter of about 1/400 to about 1/2.

3. The thermoplastic resin composition of claim 1, wherein the first metal particle has a long diameter of about 30 to about 5,000 μm.

4. The thermoplastic resin composition of claim 1, wherein the first metal particle has an average particle diameter of about 8 to about 100 μm.

5. The thermoplastic resin composition of claim 1, wherein the thermoplastic resin composition further comprises an inorganic particle of a glass particle, mica, graphite, a pearl particle, or a combination thereof.

6. The thermoplastic resin composition of claim 1, wherein the first metal particle comprises an aluminum particle.

* * * * *